US008489507B1

(12) United States Patent
Dayalan

(10) Patent No.: US 8,489,507 B1
(45) Date of Patent: Jul. 16, 2013

(54) ALTERNATIVE PAYMENT METHOD FOR ONLINE TRANSACTIONS USING INTERACTIVE VOICE RESPONSE

(75) Inventor: Joel Garner Dayalan, Chennai (IN)

(73) Assignee: Ebay Inc., San Jose, CA (US)

( * ) Notice: Subject to any disclaimer, the term of this patent is extended or adjusted under 35 U.S.C. 154(b) by 0 days.

(21) Appl. No.: 13/432,298

(22) Filed: Mar. 28, 2012

(51) Int. Cl.
*G06Q 40/00* (2012.01)

(52) U.S. Cl.
USPC .......................................................... 705/44

(58) Field of Classification Search
USPC ................................ 705/44; 726/5; 379/88.04
See application file for complete search history.

(56) References Cited

U.S. PATENT DOCUMENTS

| 6,934,858 | B2 * | 8/2005 | Woodhill | 726/5 |
|---|---|---|---|---|
| 2003/0115140 | A1 | 6/2003 | Pal | |
| 2008/0319913 | A1 | 12/2008 | Wiechers et al. | |
| 2010/0020946 | A1 * | 1/2010 | Jackson et al. | 379/88.04 |
| 2010/0312702 | A1 | 12/2010 | Bullock | |
| 2010/0332337 | A1 | 12/2010 | Bullock | |

OTHER PUBLICATIONS

Shockley, "Bridging the gap between your Web site and your call center," Telemarketing & Call Center Solutions, Jun. 1996.*

* cited by examiner

*Primary Examiner* — Samica L Norman
(74) *Attorney, Agent, or Firm* — Haynes and Boone, LLP

(57) ABSTRACT

A method for performing payments in remote transactions between buyer and vendor is provided. The method includes receiving buyer information from a vendor's network outlet when the buyer indicates a desire to purchase a selection at a later time through an Interactive Voice Response (IVR) center; providing a token to the buyer; receiving information about the token from the buyer through the IVR center; verifying the information about the token; transferring funds from a buyer account to a vendor account. Also provided is a system for processing payments in remote transactions including an IVR center and a server to: receive a request for token from a buyer to purchase products from a vendor, and to receive information about the product; provide the token to the buyer; access a database, the database including information from vendor's and buyer's accounts; transfer funds from buyer's account to vendor's account upon buyer confirmation.

20 Claims, 7 Drawing Sheets

ALTERNATIVE PAYMENT METHOD FOR ONLINE TRANSACTIONS USING INTERACTIVE VOICE RESPONSE

BACKGROUND

1. Field of the Invention

Embodiments described herein relate to the field of online commerce. More particularly, embodiments described herein are related to the field of remote vending transactions using alternative payment methods.

2. Description of Related Art

With the rapid evolution of online commerce, buyers have greater accessibility to products from a larger pool of vendors. Buyers have gained access to products for sale during a wide range of time periods and locations, which adds a pressure to make payment methods available to buyers at the time of purchase selection. In many instances, buyers may not be able to instantly provide payment for a selected product, while still interested in the purchase. In those situations, state-of-the-art systems typically release the selected product from the buyer and the sale opportunity is essentially lost.

What is needed is an alternative method of payment for online commerce that is flexible and increases a sales opportunity for the buyer and the vendor.

SUMMARY

According to embodiments disclosed herein a method for performing payments in remote transactions between a buyer and a vendor may include receiving, electronically by a processor of a service provider, information of a buyer selection from a vendor's network outlet when the buyer indicates a desire to purchase the buyer selection at a later time through an Interactive Voice Response (IVR) center; providing a token to the buyer; receiving information about the token from the buyer through the IVR center; verifying the information about the token; transferring funds from a buyer account to a vendor account.

According to further embodiments disclosed herein, a system for processing payments in remote transactions may include an interactive voice response (IVR) center configured to communicate with a buyer; a server coupled to the IVR center, the server configured to manage a plurality of private accounts including a buyer account and a vendor account; and a database coupled to the server, the database including information about the buyer account and the vendor account. In some embodiments, the server includes a processor operable to: receive a request for a token from a buyer to purchase a selected product from a vendor, and to receive information about the selected product; provide the token to the buyer via the IVR center; access the database; and transfer funds from the buyer account to the vendor account upon a buyer confirmation received by the IVR center.

Further according to some embodiments disclosed herein a computer program product may include a non-transitory computer readable medium having computer readable and executable code for instructing a processor in a service provider to perform a method, the method including: receiving, electronically by the processor, information of a buyer selection from a vendor's network outlet when the buyer indicates a desire to purchase the buyer selection at a later time through an Interactive Voice Response (IVR) center; providing a token to the buyer; receiving information about the token from the buyer through the IVR center; verifying the information about the token; transferring funds from a buyer account to a vendor account.

These and other embodiments of the present invention will be described in further detail below with reference to the following drawings.

BRIEF DESCRIPTION OF THE DRAWINGS

In the figures, elements having the same reference number have the same or similar functions.

DETAILED DESCRIPTION

Figure 1:
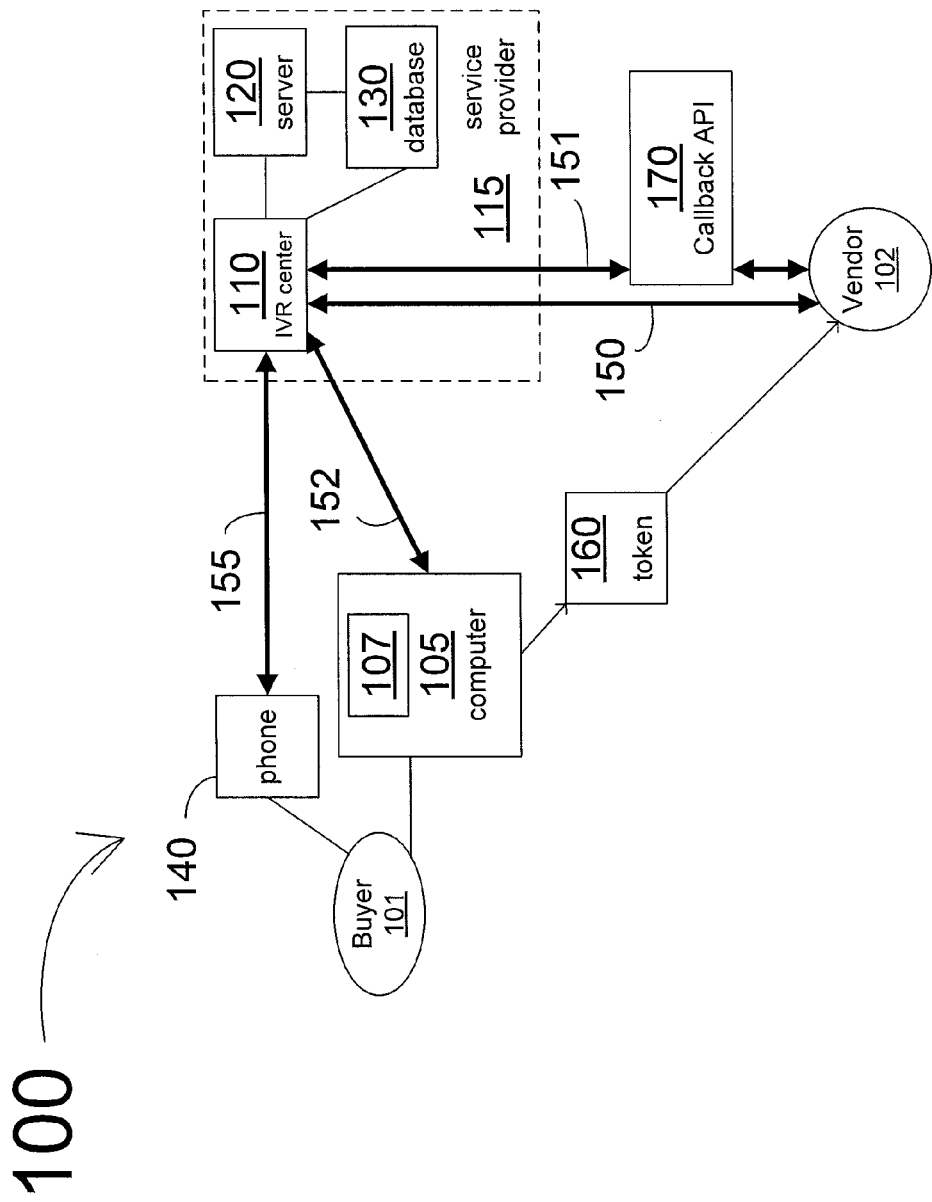
FIG. 1 shows a partial view of a system for processing payments in remote transactions, according to embodiments disclosed herein.

With the increase of network accessibility for multiple consumer electronic devices such as cellular phones and tablet computers, potential buyers have largely enhanced their purchasing capabilities. Availability of private account service providers holding funds remotely located from individual customers, further increases purchasing opportunities for potential buyers. The present disclosure includes methods and systems providing alternative payment methods for online transactions. Thus, embodiments disclosed herein increase the opportunity to close a sale online, increase sales volumes and provide greater customer satisfaction.

In embodiments consistent with the present disclosure a vendor having a network outlet for offering products uses a "Checkout Later" (CL) button in the display for the network outlet. A network outlet may be for example a web-site accessed by a buyer who is connected to the network. The "Checkout Later" (CL) button may be integrated with an Interactive Voice Response (IVR) center allowing buyers to pay for a selected product through a phone. According to some embodiments, the payment may be completed at a later time, after the buyer has selected a product from the vendor's network outlet. The CL button, the IVR center, the buyer, and the vendor may all be inter-connected through a private account service provider controlling the purchasing transaction over the network. The private account service provider may include a server or a plurality of servers having access to the network so as to receive, process, and provide information to the different parties in the transaction. Such parties may include the vendor and the buyer. In embodiments consistent with the present disclosure a buyer may complete a purchasing transaction without providing personal financial information to a vendor.

In some embodiments, the buyer has an account with the private account service provider, and is also registered in the IVR center. The IVR center may have access to a database storing the buyer's mobile phone number and the buyer's email address. The IVR center may also generate a secret code (PIN) for the buyer, so that the user may access the IVR center remotely, to complete the purchase at a later time. The IVR center may also have access to the buyer account, managed by the private account service provider.

According to some embodiments, the vendor is also registered in the IVR center. The vendor's network outlet may host the CL button as part of the registration features of the vendor with the IVR center. Thus, a list of the products offered in the vendor's network outlet may be stored in the database accessed by the IVR center. Such a list may include product characteristics as name, type, model number, catalogue number, price, availability, size, color, and any other characteristics. The vendor creates a token to each product listed in the vendor's network outlet. The token created by the vendor may include a single product or a plurality of products. Furthermore, the token created by the vendor may include product information such as name, type, model number, catalogue number, price, availability, size, color and any other characteristics, in an encrypted code. The vendor transfers the encrypted token including the product information to the IVR center. The IVR center in turn decrypts the encrypted token received from the vendor and then assigns a user friendly token to the buyer for that particular transaction. According to some embodiments, a user friendly token is such that the buyer easily provides a token code upon a prompt message from the IVR center.

The user selects a product from the vendor's network outlet. Instead of paying immediately, the user may select the CL button in the vendor's network outlet. The buyer is then prompted to enter its mobile phone number and an e-mail address through the vendor's network outlet. For example, the buyer may enter an e-mail address already registered with a buyer account in the IVR center. The e-mail address provided by the buyer may be an e-mail address associated to a buyer account registered with a private account service provider, as above. The IVR center has access to the information entered by the buyer through the vendor registration with the IVR system. The information entered by the buyer may be linked to the selected product, according to data provided by the vendor to the IVR center through the vendor's network outlet. The IVR center provides the buyer with a token associated to the selected product. For example, the IVR center may provide the token to the registered buyer's mobile phone through a text message. In some embodiments, the IVR center may provide the token to the registered buyer through an e-mail message. The token may be identified by a user-friendly token code. A user-friendly token code may be a code including a plain language descriptor of the selected product. In some embodiments, a user-friendly token code may include characters that may be found in conventional mobile phones, such as text characters and numbers. For example, text characters may include letters in the alphabet, and numbers may include digits from 0 to 9. A user friendly-code is simple to enter using standard mobile phone technology, or even older mobile phone technology still available in certain locations. According to some embodiments, the IVR center may provide the token to the buyer via e-mail, text, or voice. In embodiments consistent with the present disclosure, buyers use their mobile phone to make a call to the IVR center at a later time, when ready to pay for the selected product. During the call to the IVR center, a buyer may be prompted to enter or key-in the user-friendly token code received in the buyer's mobile phone at the time of product selection.

If the user-friendly token code provided by the buyer to the IVR center is correct, the IVR center confirms the amount to pay when the buyer chooses to proceed. The buyer is then prompted to provide the PIN code to the IVR center. Once the PIN code is authenticated, the transaction is confirmed and the payment executed. In some embodiments, the payment is executed by a server in the private account service provider, the server having access to a buyer account and a vendor account. The server debits the buyer account and credits the vendor account in the amount of the transaction.

According to some embodiments, the time from the buyer calling the IVR system for completing the purchase to the transferring of the funds, may be a few seconds. According to some embodiments, the user may decide to make the payment at a time later than the time of selection of the product from the vendor's network outlet. The period of time lapsed between the product selection and the actual purchase may be within a lifetime of the token. The lifetime of the token may be determined by the private account service provider based on rules established in agreement with the vendor. In some embodiments, the lifetime of the token is determined by the IVR center.

FIG. 1 shows a system 100 for processing payments in remote transactions, according to embodiments disclosed herein. System 100 comprises an Interactive Voice Response (IVR) center 110 configured to receive a request for a token 160 from a remote buyer 101. Token 160 is related to a purchase of a selected product from a vendor 102. Vendor 102 may have a network outlet or web-site to which buyer 101 may have access through a computer 105. In embodiments consistent with the present disclosure, buyer 101 accesses vendor's network outlet through a computer 105. Computer 105 may also be coupled to IVR center 110 through network link 152. IVR center 110 receives information about the selected product from network link 152. In some embodiments, IVR center 110 provides token 160 to buyer 101 using a network link 155 coupling IVR center 110 to a mobile phone 140 that belongs to user 101.

Furthermore, upon a request made by vendor 102, IVR center 110 may place a "Checkout Later" (CL) button 107 in the network outlet for vendor 102. The request from vendor 102 to IVR center 110 maybe placed through a regular network channel such as channel 150, linking a data center for vendor 102 to IVR center 110. According to some embodiments, CL button 107 is displayed by computer 105 when buyer 101 accesses the vendor's network outlet. Computer 105 may be a desktop, a laptop, or any mobile device having network access. When CL button 107 in vendor's network outlet is selected by buyer 101 together with a product showcased in the vendor's network outlet, a token request to IVR center 110 is generated. Selection may be through a tap, click, or other suitable means. CL button 107 need not be an actual button, in which case, the CL feature may also be selected by checking an associated box. Vendor 102 may decide to hold the selected product for a period of time before offering the selected product for sale to a third party. This gives buyer 101 more opportunity to finalize the purchase before the selected product is released for purchase by another potential buyer. This approach is desirable in situations where buyer 101 is temporarily unable to use funds in a given account to complete a purchase, but still determined to make the purchase. In such situations, the ability to hold-on to the selected product may be beneficial for both buyer 101 and vendor 102. For example, buyer 101 may be in the process of transferring funds to a remote account from which the purchase will be completed.

Selecting CL button 107 enables buyer 101 to complete the purchase after funds have been transferred and are available in the remote account. In some circumstances, buyer 101 may have an unrelated emergency in the midst of the purchasing process, and be unable to complete the purchase immediately. In some circumstances, buyer 101 may temporarily lose connectivity through links 152 or 155, and be unable to complete the purchase. In all the above circumstances, using CL button 107 in system 100 enables buyer 101 to complete the purchase at a more convenient time, later.

According to some embodiments, IVR center 110 transfers funds from a buyer account to a vendor account upon a buyer confirmation received by IVR center 110. If for any reason buyer 101 decides to cancel the transaction, it may so inform IVR center 110. The transaction may also be cancelled if a token lifetime has expired, or if buyer 101 enters an invalid token code. In the event that the purchase is cancelled, IVR center 110 informs vendor 102 that the transaction has been cancelled using communication channel 150. IVR center 110 is coupled to a database 130, storing information from the buyer account and the vendor account. Database 130 may store personal information from buyer 101. For example, database 130 may include a mobile phone number for mobile phone 140 and an e-mail address for buyer 101.

In some embodiments, buyer 101 calls IVR center 110 from mobile phone 140 using link 155 to confirm purchase of the selected product and pay for the purchase. At that moment, in order to authenticate the call, IVR center 110 may request a code for token 160 from buyer 101. In some embodiments, token 160 may have a lifetime after which the token is no longer valid. Having a lifetime for token 160 limits the vulnerability of system 100 to misuse and third party intrusion. Having a lifetime for token 160 also reduces stocking liability, in case vendor 102 decides to withhold the selected product for buyer 101. If buyer 101 calls IVR center 110 with a valid token code and within the lifetime of token 160, IVR center 110 contacts vendor 102 to confirm availability of the selected product. Token 160 may also have additional limitations or restrictions, such as based on location. For example, if the token is presented by the consumer at a location in India thirty minutes after the token was generated by a transaction made at a location in the United States, the transaction may be denied even if the token was valid and not expired. If vendor 102 confirms availability of the selected product, IVR center 110 contacts buyer 101 to confirm and finalize the purchase. According to some embodiments, IVR center 110 may contact vendor 102 through network link 151. In some embodiments, network link 151 may be controlled by an internal application 170 called "Callback API." Callback API 170 may communicate a request for the selected product according to the token information to the vendor inventory system, through link 151. Further, vendor 102 may send a response back to IVR center 110 using Callback API 170 through link 151. Callback API 170 is an application having software and instructions running in a vendor data center included in vendor 102, and also having software and instructions running in IVR center 110. Callback API 170 transfers messages and information between vendor 102 and IVR center 110, through link 151. Internal application Callback API 170 may be activated by a private account service provider 115, upon request by the vendor.

According to embodiments consistent with the present disclosure, callback API 170 is used by IVR center 110 to verify the inventory in vendor 102. Also, vendor 102 may use callback API 170 to communicate IVR center 110 that a selected product as requested by a buyer using the CL button may be out of stock.

According to some embodiments, IVR center 110 and database 130 may be included in a private account service provider 115. Private account service provider 115 may include server 120 having a register for buyer 101 and a register for vendor 102. Registers in private account service provider 115 include information from buyer 101 and vendor 102. For example, the buyer account and the vendor account may be included in private account service provider 115. The information from buyer 101 and from vendor 102 may be stored in database 130. The information of registered buyer 101 and registered vendor 102 may be accessed and processed in private account service provider 115 by IVR center 110, and by server 120. For example, mobile phone 140 may be associated to user 101 according to a register in private account service provider 115. The telephone number for mobile phone 140 may be stored in database 130 and used by IVR center 110 to call user 101. Furthermore, IVR center 110 may be configured to register buyer 101 with private account service provider 115 upon request from buyer 101. The request from buyer 101 to create an account in private account service provider 115 may be made on a computer 105 through network link 152, or via a mobile phone 140 through link 155. According to some embodiments, the request from buyer 101 to create an account in private account service provider 115 may be processed by IVR center 110.

According to some embodiments, IVR center 110, server 120, and database 130 may each include a processor circuit and a memory circuit. The processor circuit may be used by IVR center 110, by server 120, and by database 130 to receive, process, and store information. For example, the information may be encoded digitally or analogically, and may be transmitted electronically, or through electromagnetic radiation either optically or through radio-frequency.

Figure 2:
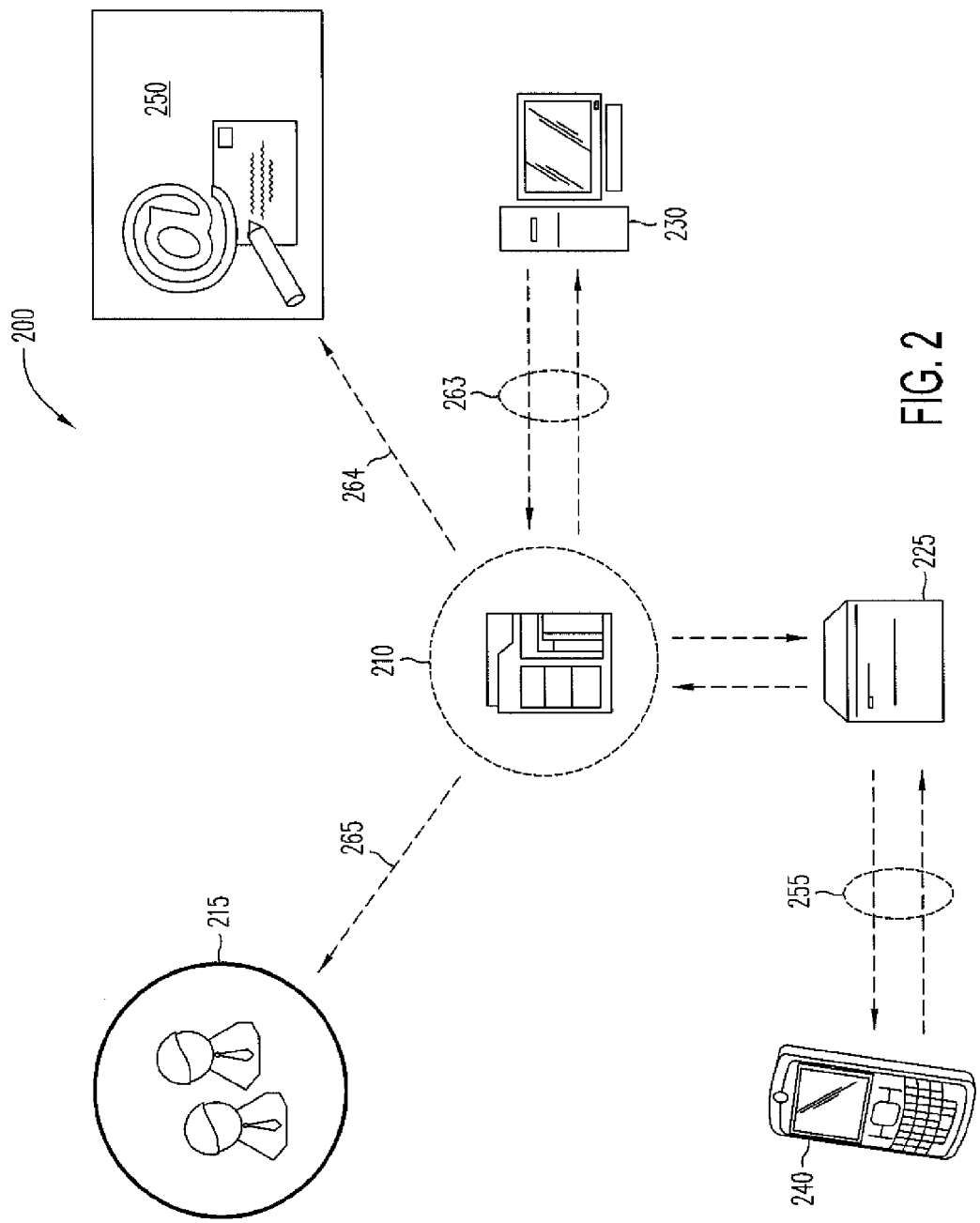
FIG. 2 shows a partial view of a system for processing payments in remote transactions, according to embodiments disclosed herein.

FIG. 2 shows a partial view of a system 200 for processing payments in remote transactions, according to embodiments disclosed herein. System 200 includes an IVR center 210, a database 230, a public switch box (PBX) 225, and an agent pool 215. IVR center 210 and database 230 in system 200 may be as described in detail in relation to IVR center 110 and database 130 in FIG. 1, above. IVR center 210 is coupled to database 230 through a link 263. Link 263 may be a network link remotely coupling database 230 to IVR center 210. A link 265 may be a telephone line or a network line carrying voice data between IVR center 210 and agent pool 215. A link 264 is a network link coupling IVR center 210 and a network server 250. Network server 250 may be configured to provide e-mail services or host web-page services for a plurality of users. Switch box (PBX) 225 is coupled to a telephone network through a voice data link 255. In some embodiments, link 255 is a wireless link for a mobile phone network, so that a buyer with a mobile phone 240 can connect with IVR center 210.

According to embodiments consistent with the present disclosure, a buyer uses phone 240 to place a call to IVR center 210. The buyer may be as buyer 101 described in detail above in relation to FIG. 1. Thus, the buyer may have an account with a private account service provider, and may have selected a product for purchase at a vendor's network outlet or web-site. The buyer may also have previously selected a CL button in the vendor's network outlet. The CL button may be as CL button 107 described in detail above in relation to FIG. 1. The buyer places the call to IVR center 210 to complete the purchasing transaction using a token code. The token code may be a user-friendly code associated to a token such as token 160, described in detail above in relation to FIG. 1.

According to some embodiments, PBX 225 directs the phone call from mobile phone 240 to IVR center 210. IVR center 210 may then redirect the call through link 265 to agent pool 215. In agent pool 215, a person acting as agent may take the call and help the buyer complete the transaction. According to embodiments consistent with the present disclosure, the agent requests the buyer to provide the token number or code. Then the agent is able to find the selected product associated to the token from the vendor, by accessing database 230 through link 263. The agent communicates with the vendor to confirm the availability of the selected product. The agent may communicate with the vendor using link 255. According to embodiments consistent with the present disclosure, the agent may use an internal application such as Callback API 170 (cf. FIG. 1) to communicate with the vendor, through link 255. The agent in agent pool 215 may also communicate with the vendor or the vendor's network outlet using network link 264. Once the vendor confirms availability, the agent communicates with the buyer through mobile phone 240 to confirm the transaction. When the transaction is confirmed, the agent directs IVR 210 to transfer funds from the buyer account to a vendor account.

In some embodiments, the agent in agent pool 215 may be a computer or an automated machine. In some embodiments, agent pool 215 may include a combination of people and automated machines. Further according to some embodiments, an agent in agent pool 215 may be a person who relays the completion of the above described tasks to an automated machine at any given point during communication with the buyer.

In communicating with the buyer and the vendor, the agent in pool 215 may send and receive e-mails to server 250 through link 264. The agent may also provide to and retrieve data from the buyer and the vendor in a network outlet hosted by server 250, through network link 264. For example, the agent in pool 215 may have access to a vendor's inventory through server 250 and thus be able to confirm availability of the selected product for the buyer. According to embodiments consistent with the present disclosure, the buyer may choose to finalize the purchase of the selected product, such as through e-mail, text, and/or voice, using server 250 and link 264. Thus, the user-friendly token code may be provided to IVR server 210 by e-mail, text, or voice, or through a network outlet or web-site, through server 250. In some embodiments the network outlet used by the buyer to finalize the purchase transaction may be the vendor's network outlet. Thus, the buyer is able to return at a later time to the vendor's network outlet, to finalize the purchase.

Figure 3:
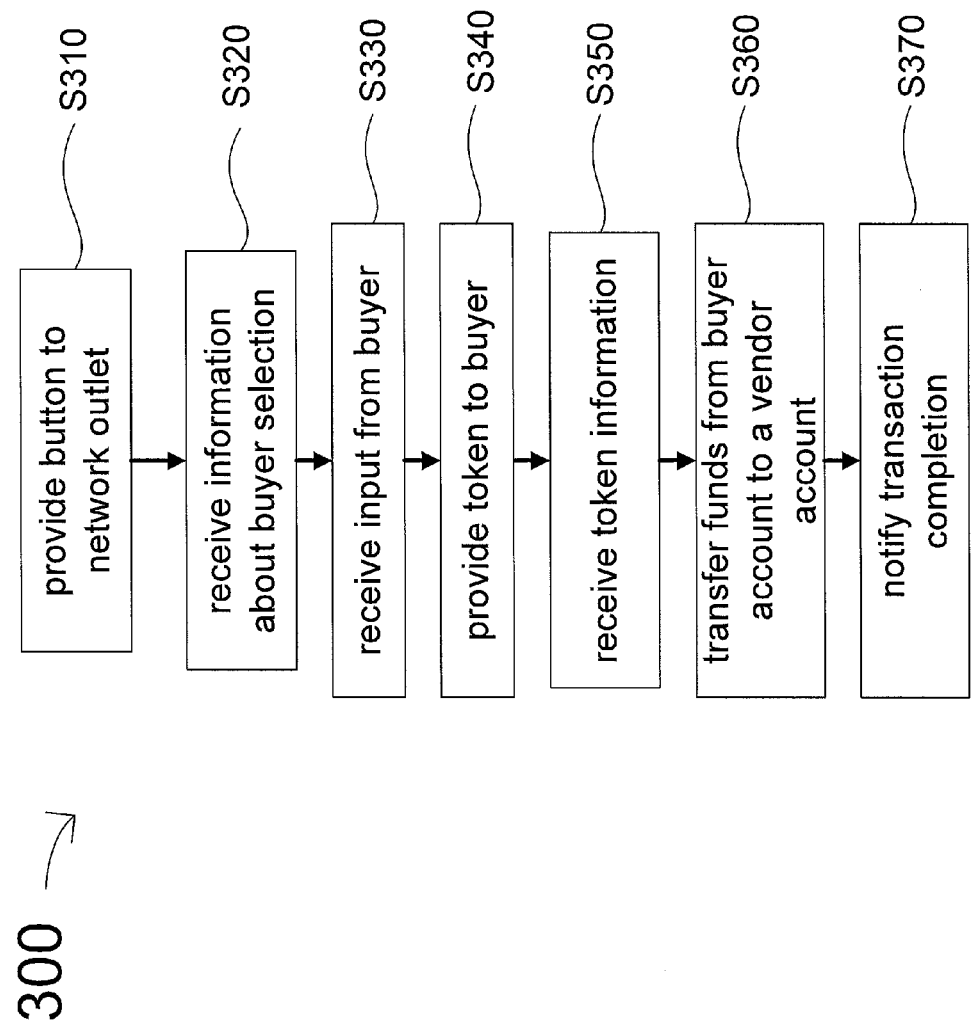
FIG. 3 shows a flow diagram in a method for performing payments in remote transactions, according to embodiments disclosed herein.

FIG. 3 shows a flow diagram in a method 300 for performing payments in remote transactions, according to embodiments disclosed herein. According to embodiments consistent with the present disclosure, method 300 may be performed by a service provider, such as with an IVR center. The service provider may be as service provider 115, and the IVR center may be such as IVR center 110 or IVR center 210 described in detail above (cf. FIGS. 1 and 2). Method 300 includes providing a CL button to a network outlet in S310, the CL button linked to a private account service provider in S310. The network outlet may be such as the vendor's network outlet accessed through computer 105 in FIG. 1. The private account service provider may be as private account service provider 115, described in detail above in relation to FIG. 1.

S320 in method 300 receives information about a buyer selection. In some embodiments, information about a buyer selection may include information about a selected product. The selected product is chosen from the vendor webpage when the CL button is selected. Information received in S320 may be used by an IVR center to retrieve account information from the vendor. S330 in method 300 receives input from the buyer. For example, S330 may receive a buyer's e-mail address or other identifier. For example, the buyer's e-mail address may be associated to an account in the private account service provider such as private account service provider 115. Information received in S330 may be used by an IVR center to retrieve account information from the buyer. According to embodiments consistent with the present disclosure, the vendor has no direct access to the buyer's account information.

S340 in method 300 provides a token to the buyer. The token may be as token 160 described in detail above in relation to FIG. 1. Token 160 may be generated at the vendor's network outlet using information such as the selected product information provided in S320. Token 160 may also include buyer information such as a buyer e-mail address, as provided in S330. Token 160 as generated at the vendor's network outlet may be encrypted and provided to the IVR center. According to some embodiments, token 160 may be generated in server 250 and provided to IVR center 210 (cf. FIG. 2) through network link 264. The IVR center then provides token 160 to the buyer, including a user-friendly token code. In some embodiments, the IVR center provides token 160 to the buyer mobile phone 240 through link 255 (cf. FIG. 2). For example, the buyer may get a text message in mobile phone 240 from IVR center 210, announcing that the token has been generated, and providing the user-friendly token code. Token 160 may also have an expiration time. The expiration time in token 160 may be set according to specific circumstances such as selected product availability and demand at the time of buyer selection. In some embodiments, the expiration time in token 160 is determined by the IVR center as per a pre-established agreement between the IVR center and the vendor.

S350 in method 300 receives token information from the buyer to complete the transaction. S350 may be initiated at a point in time after S320 but prior to the token's expiration time. After receiving the token in S340, the buyer may place a call to the IVR center to close the purchase transaction. For example, the buyer may use mobile phone 240 through line 255 to call IVR center 210. In some embodiments, S350 may include a prompt by IVR center 210 to the buyer to enter the token code provided in S340. For example, an agent in agent pool 215 may request the buyer to use a touch pad in mobile phone 240 to key-in the token number or speak the number or code into mobile phone 240. Once the token code is validated, the IVR center communicates with the vendor to confirm availability of the selected product. In some embodiments, IVR center 210 may access the inventory in vendor's network outlet hosted in server 250, through network link 264. If the selected product is available, IVR center 210 may then request a PIN confirmation from the buyer prior to completing the transaction. S360 in method 300 transfers funds from a buyer account to a vendor account in the amount stipulated by the token. S370 in method 300 notifies the buyer and the vendor of the transaction completion, such as through text, email, or voice.

Figure 4:
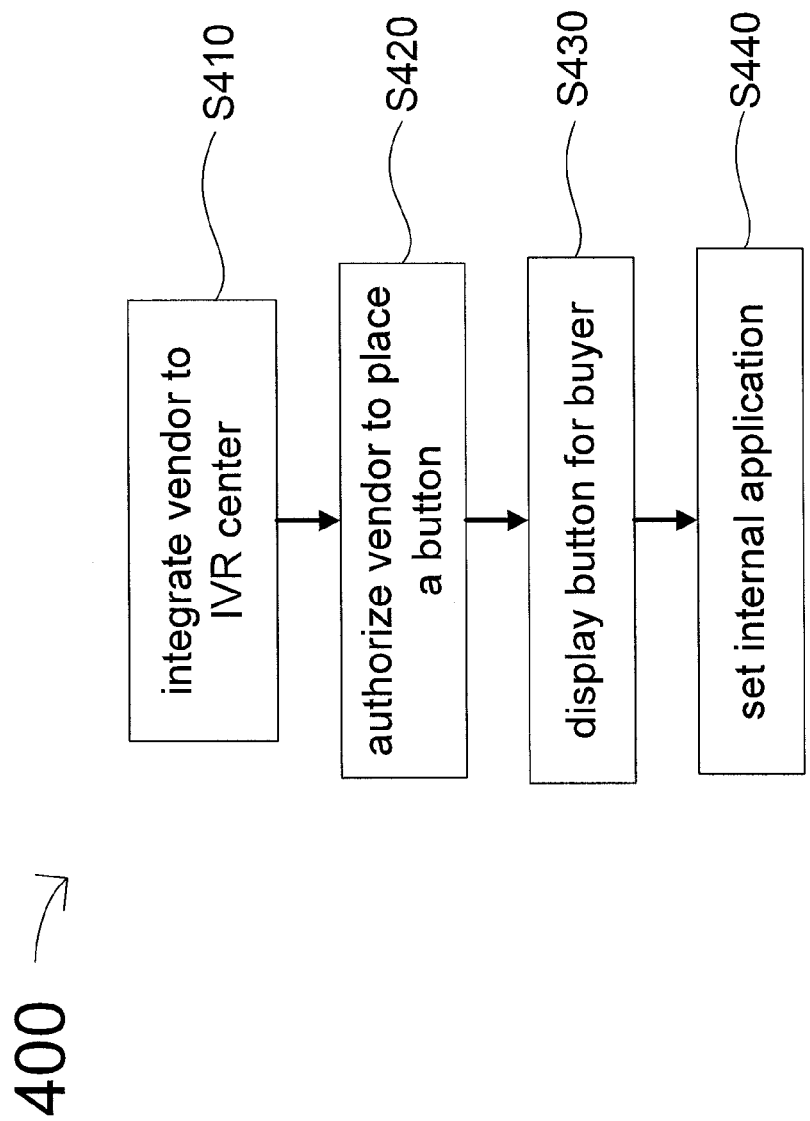
FIG. 4 shows a flow diagram in a method for performing payments in remote transactions, according to embodiments disclosed herein.

FIG. 4 shows a flow diagram in a method 400 for performing payments in remote transactions, according to embodiments disclosed herein. According to some embodiments, method 400 is performed by a service provider, such as with an IVR center. The service provider may be as service provider 115, and the IVR center may be such as IVR center 110 or IVR center 210 (cf. FIGS. 1 and 2). In S410, a vendor is integrated into the IVR center system. S410 may include receiving a request from the vendor to host a CL button in a vendor's network outlet. S420 includes authorizing the vendor to place a CL button in the vendor's network outlet, according to terms and conditions of a contract between the IVR center and the vendor. The CL button hosted in S410 may be as CL button 107 described in detail above in relation to FIG. 1. S430 includes displaying the CL button on a vendor's network outlet for potential users to select together with the selection of a product for purchase. S430 may also include creating an account for the vendor within the IVR center. For example, the account for the vendor may be an account in private account service provider 115 including IVR center 110 (cf. FIG. 1). In such embodiments, information related to the vendor's account may be stored in database 130.

According to embodiments consistent with the present disclosure, IVR center 110 may be part of a private account service provider such as private account service provider 115. In such embodiments, private account service provider 115 may send a message to users and potential buyers about a vendor registration with IVR center 110 to host a CL button. For example, private account service provider 115 may send an e-mail message to its account subscribers with a link to a network outlet or web-site that displays an updated list of all vendors registered with IVR center 110.

In S440, the service provider such as the IVR center sets an internal application for communicating between the IVR center and the vendor. An internal application may include software and instructions running in the IVR center and software and instructions running in a vendor data center. The internal application in S440 controls a fast and secure communication link between the vendor and the IVR center. For example, the internal application in S440 may be as Callback API 170, and the communication link may be as link 151 (cf. FIG. 1). According to some embodiments, an internal callback application in S440 may be as callback API 170 controlling link 151 (cf. FIG. 1).

Figure 5:
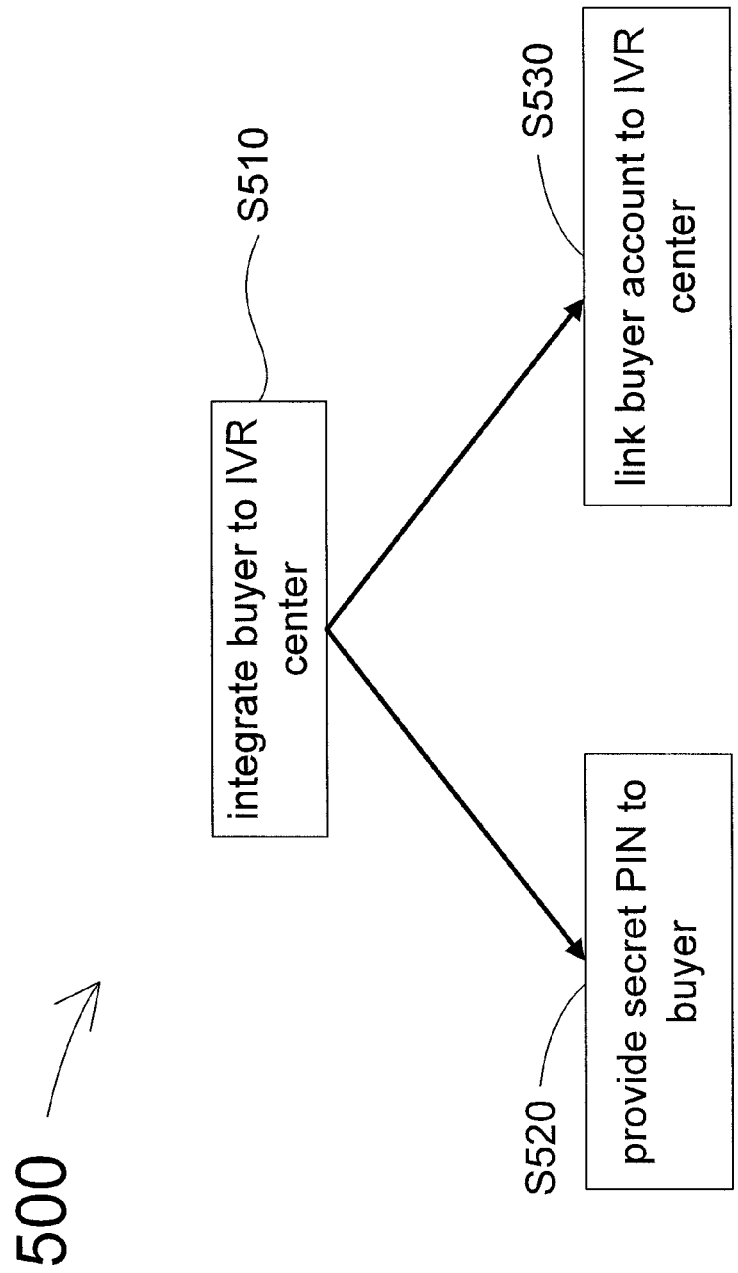
FIG. 5 shows a flow diagram in a method for performing payments in remote transactions, according to embodiments disclosed herein.

FIG. 5 shows a flow diagram in a method 500 for performing payments in remote transactions according to embodiments disclosed herein. According to some embodiments, method 500 is performed by a service provider, such as with an IVR center. The service provider may be as service provider 115, and the IVR center may be such as IVR center 110 or IVR center 210 (cf. FIGS. 1 and 2). Furthermore, an IVR center performing method 500 may be included in a private account service provider such as private account service provider 115 (cf. FIG. 1). S510 in method 500 includes registering the buyer with the private account service provider. S510 in method 500 also integrates the buyer to the IVR center. S510 may include creating a user account for the buyer stored in a database controlled by the service account service provider and linked to the IVR center. S510 may include personal buyer information in the database controlled by the private account service provider. The personal buyer information provided in S510 includes user account identifiers, such as a mobile phone number, a user name, and/or an e-mail address for the user. In some embodiments the database may be such as database 230 (cf. FIG. 2) linked to IVR center 210. Thus, IVR center 210 may have access to a buyer account controlled by the private account service provider.

S520 provides a secret PIN to the buyer, so that the buyer may use this PIN to close purchase transactions. The PIN or password may be selected by the buyer, subject to approval by the service provider. According to some embodiments, the IVR center may prompt the buyer to enter the secret PIN before transferring funds from the buyer account to a vendor account. S530 links the buyer account controlled by the private account service provider to the IVR center. In some embodiments, S530 stores the secret PIN provided to the buyer in S520 to the account created in S510 upon registration of the buyer with the service account service provider.

Figure 6:
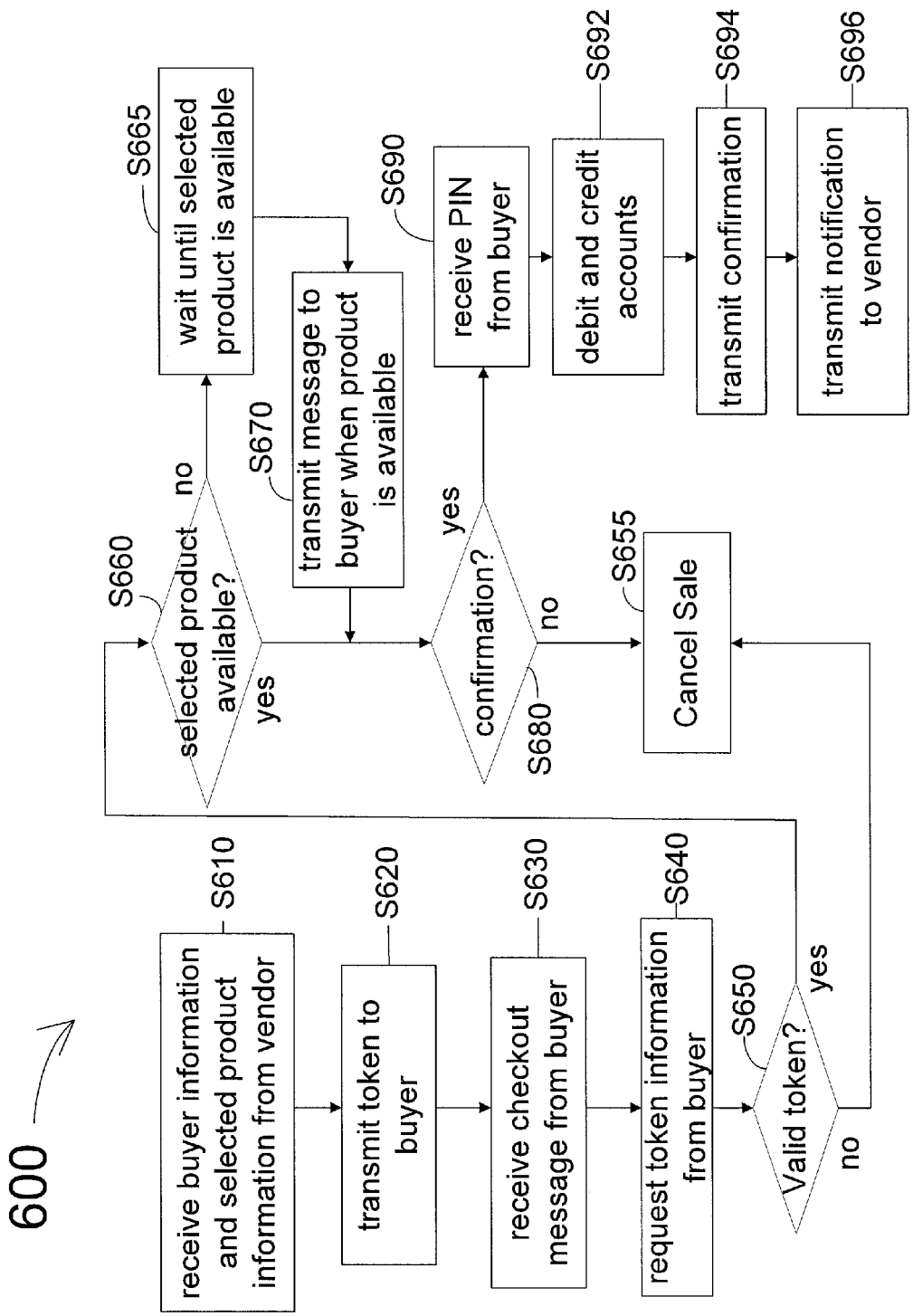
FIG. 6 shows a flow diagram in a method for performing payments in remote transactions, according to embodiments disclosed herein.

FIG. 6 shows a flow diagram in a method 600 for performing payments in remote transactions, according to embodiments disclosed herein. Method 600 may be performed by a service provider, such as with an IVR center included in a private account service provider. The service provider may be as service provider 115, and the IVR center may be such as IVR center 110, or IVR center 210 described in detail above (cf. FIGS. 1 and 2). For example, an IVR center performing method 600 may be IVR center 110 or IVR center 210, and a private account service provider may be private account service provider 115 (cf. FIGS. 1 and 2). In embodiments consistent with the present disclosure, method 600 is performed when a buyer has selected a product and a CL button on a vendor's network outlet. For example, the user may be navigating the internet using a computer or a mobile device having internet connection at the time of deciding to make a purchase. The computer may be such as computer 105 and the CL button may be as CL button 107 (cf. FIG. 1). The vendor's network outlet may be hosted by a server such as server 250 (cf. FIG. 2).

According to embodiments consistent with the present disclosure, on the click of the CL button in the vendor's network outlet, a 'widget' including the message: "Checkout with IVR, please enter email id" is presented to the buyer. The widget may pop up in a display included in computer 105. The buyer may then choose to checkout a selected product and enters an email in the widget. The email requested in the widget may be an identifier for a buyer account with a private account service provider.

S610 in method 600 includes receiving buyer information and receiving selected product information from the vendor. For example, the buyer information and the selected product information may be included in an encrypted token transferred from the vendor to the IVR center using a regular communication channel between the vendor and the IVR center. For example, in embodiments including IVR center 110 and vendor 102, the encrypted token may be transmitted from vendor 102 to IVR center 110 through channel 150. The buyer information received by the IVR center in S610 may include a buyer's e-mail address. With the buyer's e-mail address, the IVR center may retrieve a buyer's account information from a database. In some embodiments, the IVR center in S610 may be as IVR center 110 included in private account service provider 115 (cf. FIG. 1). Further, the IVR center may be as IVR center 210 and be coupled to database 230 (cf. FIG. 2). Database 230 may include account information for the buyer in the private account service provider, and the IVR center may retrieve the buyer's account information through link 263.

The selected product information received by the IVR center in S610 may be the selected product price, availability, and other information relevant to the sale. For example, the selected product information may include information related to a discount or temporary price reduction for the selected product. A discount or temporary price reduction may be as advertised in the vendor's network outlet, including an expiration date for the price reduction. According to some embodiments the IVR center receives in S610 selected product details from the vendor, along with the email entered by the user. In some embodiments, the information received by IVR center may be formatted into an encrypted token. The token may have an expiration time set by the IVR center according to an agreement established with the vendor. The agreement between the IVR center and the vendor may be established at the time of the vendor registration with the IVR center (cf. FIG. 4). The agreement between the vendor and the IVR center may include sales and temporary price reductions. Thus, in addition to the encrypted token, the vendor may provide information about a temporary price reduction or sale of the selected product. Furthermore, the information about a temporary price reduction or sale of the selected product may be included in the encrypted token provided by the vendor to the IVR center. Thus, if the selected product has a temporary price reduction the IVR center may set the token expiration time within the validity of the temporary price reduction.

S620 method 600 includes transmitting a token to the buyer. The token may include the encrypted token information received by the IVR center in S610. According to some embodiments, the IVR center generates in S620 a token based on the information received from the vendor in S610. In embodiments consistent with the present disclosure, the IVR center sets the token expiration time in S620 using the information received in S610. For example, the IVR center may determine the token expiration time based on the selected product availability, according to the vendor's inventory. Also, in some embodiments the token expiration time may be determined based on a temporary price reduction for the selected product. In S620, the IVR center may send the token to a buyer's mobile phone. For example, the IVR center may be as IVR center 210, transmitting the token to a buyer's mobile phone 240 through link 255, using PBX 225 (cf. FIG. 2). According to embodiments consistent with the present disclosure, the vendor may provide an encrypted token to the IVR center in S610 and the IVR center may transmit a user-friendly token to the buyer in S620. The encrypted token provided by the vendor to the IVR center is associated to the user-friendly token provided by the IVR center to the buyer. The encrypted token and the user-friendly token are related to the same purchase transaction. The user-friendly token transmitted from the IVR center to the buyer includes a user-friendly code. For example, the user-friendly code may include ASCII characters that the buyer may type-in using any text formatting application. The user-friendly code may also include characters that the buyer may key-in using a mobile phone such as mobile phone 240 (cf. FIG. 2).

Once the buyer is in possession of the user-friendly token, the user may checkout the selected product at any time prior to the token expiration time.

S630 includes receiving a checkout message from the buyer. S630 may occur at a later time relative to the occurrence of S610 and S620. S630 may also occur prior to a token expiration time, as determined by IVR center in S620. In S630, the buyer may place a call to the IVR center in order to complete the purchase transaction of a selected product.

S640 requests token information from the buyer. A token information may include a user-friendly code associated to the token as provided to the buyer in S620. According to some embodiments IVR center 210 receives a call from the buyer through link 255 and PBX 225 (cf. FIG. 2). Once the call gets connected, IVR center 210 may produce a voice message to the buyer (Mr/Ms XX) as follows: "Hello Mr/MS XX, please enter the received token." Thus, IVR center 210 prompts the buyer to enter the user-friendly token code.

In S640, the IVR center may prompt the buyer to enter a user-friendly code for a given token previously provided to the buyer in S620. For example, IVR center 210 may request the buyer to key-in the user-friendly code using mobile phone 240 (cf. FIG. 2). IVR center 210 may then receive the user-friendly code through link 255 and PBX 225.

S650 queries whether the token related to the token information from the buyer is a valid token. In S650 the IVR center searches in a database for a token related to the user-friendly code provided by the buyer in S640. For example, IVR 210 may use database 230 through link 263 to search for a match of the user-friendly code received from the buyer in S640. Once a match is found, S650 may verify that the buyer information stored in the database for the matched token corresponds to the mobile phone number used by the buyer to enter the user-friendly code. According to some embodiments, if the mobile phone number used by the buyer does not match the information in the database, the IVR center may request further personal information from the buyer. For example, the IVR center may request that the user enter an e-mail address, a PIN code, or an account number that may be matched with the information stored in the database related to the buyer. Thus, it is not necessary for the buyer to provide the user-friendly token code from a specific mobile phone. In some embodiments, S650 may also include verifying that the token lifetime has not expired, according to some embodiments.

S655 cancels the sale if the token is found in S650 to be invalid. If IVR center is unable to find a match for the user-friendly code entered by the buyer in S640, then the transaction is cancelled. In some circumstances, the IVR may not be able to match the buyer information to an account in the database, or to the buyer information stored in the database corresponding to the given token. In such circumstance, even if the user-friendly code corresponds to a valid token prior to the expiration time, the IVR center may determine to cancel the sale in S655. Further according to some embodiments, the IVR center may cancel the transaction in S655 if it is found that the token expiration time has lapsed. According to embodiments consistent with the present disclosure, the IVR center communicates its decision to cancel the sale in S655 to both buyer and also to the vendor. Thus, the buyer may attempt to purchase the selected product, and the vendor may release the selected product for purchase by a different buyer.

If the user-friendly token code is validated in S650, then S660 queries whether the selected product associated with the token is still available. The IVR center may perform S660 by accessing the vendor's inventory through a vendor account with a private account service provider. For example, in some embodiments IVR center 110 may be as IVR center 110, included in private account service provider 115 (cf. FIG. 1). In such embodiments, vendor 102 may have an account with private account service provider 115. The vendor's account with private account service provider 115 may include access to the vendor's inventory. According to some embodiments, the IVR center performs S660 by using an internal application, as described above. For example, in some embodiments the IVR center may be as IVR center 110 and the internal application may be as Callback API 170 communicating IVR center 110 with vendor 102, through link 151 (cf. FIG. 1).

If the IVR center determines in S660 that the selected product is not available, the IVR center informs the user in S665 that the system will wait until the selected product is available and terminates the call. According to some embodiments, before terminating the call with the buyer the IVR center may inform the buyer that an SMS or e-mail message will be sent to the buyer when the selected product becomes available. According to some embodiments, in S665 the IVR center may receive a message from the vendor when the selected product becomes available. Once the IVR center determines that the selected product is available, the IVR center sends in S670 a short message service (SMS) or e-mail message to the buyer, informing the buyer that the product is available. Also in S670, the IVR center may re-set the token expiration time based upon the time at which the selected product has become available in the vendor's inventory.

S680 confirms purchase with the buyer if the selected product is available, according to S660. If the buyer chooses not to confirm the purchase, then IVR center returns to S655 and cancels the sale. In such case, the IVR center informs the vendor that the sale has been cancelled, so that the vendor may release the selected product for purchase by another buyer. The IVR may inform the vendor that the purchase has been cancelled using communication channel 150.

To complete purchase confirmation, the IVR center may prompt buyer in S690 to enter a secret code. In some embodiments, the secret code is the PIN associated to the buyer at the time of registration with the IVR center. The IVR center may use in S690 a message to the buyer such as "You are going to pay XX amount to vendor YY, please type-in your PIN to complete the payment;" where XX is the price of the selected product and YY is the name or brand of the vendor. According to embodiments consistent with the present disclosure, the message in S690 may be provided to the buyer via a telephone call. For example, IVR center 210 may include the above message in a call to mobile phone 240 through link 255 using PBX 225 (cf. FIG. 2).

If the PIN provided by the buyer in S690 is correct, the IVR center debits a buyer account in S692. In embodiments consistent with the present disclosure, the buyer account may be an account with a private account service provider that includes the IVR center. For example, the buyer account may be one of a plurality of accounts that the buyer may have with the private account service provider. In such configuration, the buyer may have a pre-selected account to be debited for the transaction. In some embodiments, when the buyer has a plurality of accounts registered with the private account service provider the IVR center may prompt the buyer to choose an account to be debited. In S692, the IVR center also credits a vendor account for the purchase. In some embodiments, the vendor account may be an account with the private account service provider including the IVR center. The amount credited to the vendor account may be equal to or smaller than the amount debited from the buyer account. In some embodiments, certain charges and costs may be accrued by the user for the purchase of the selected item using method 600. Thus, the IVR center may debit the buyer account by an amount somewhat higher than the amount credited to the vendor account. In some embodiments the amount debited to the buyer account may be smaller than the amount credited to the vendor account. For example, in some circumstances the buyer account may have a credit from the private account service provider which reduces the amount debited to the buyer account.

In S694 the IVR center transmits a confirmation of the purchase to the buyer. And in S696 the IVR center transmits a notification of the sale to the vendor. The IVR center may perform S694 and S696 either via a phone call, an e-mail, or a combination of a phone call and an e-mail. For example, IVR center 210 may use link 255 and PBX 225 to place a call to buyer mobile phone 240 or a vendor mobile phone, or telephone. IVR center 210 may also use link 264 to send an e-mail notifying the completion of the purchase to the user, the vendor, or both, through server 250. In some embodiments, S694 may include a short message service (SMS) through link 255 with payment details, to the buyer. In some embodiments, S696 may include an instant payment notification (IPN) message to the vendor.

Figure 7:
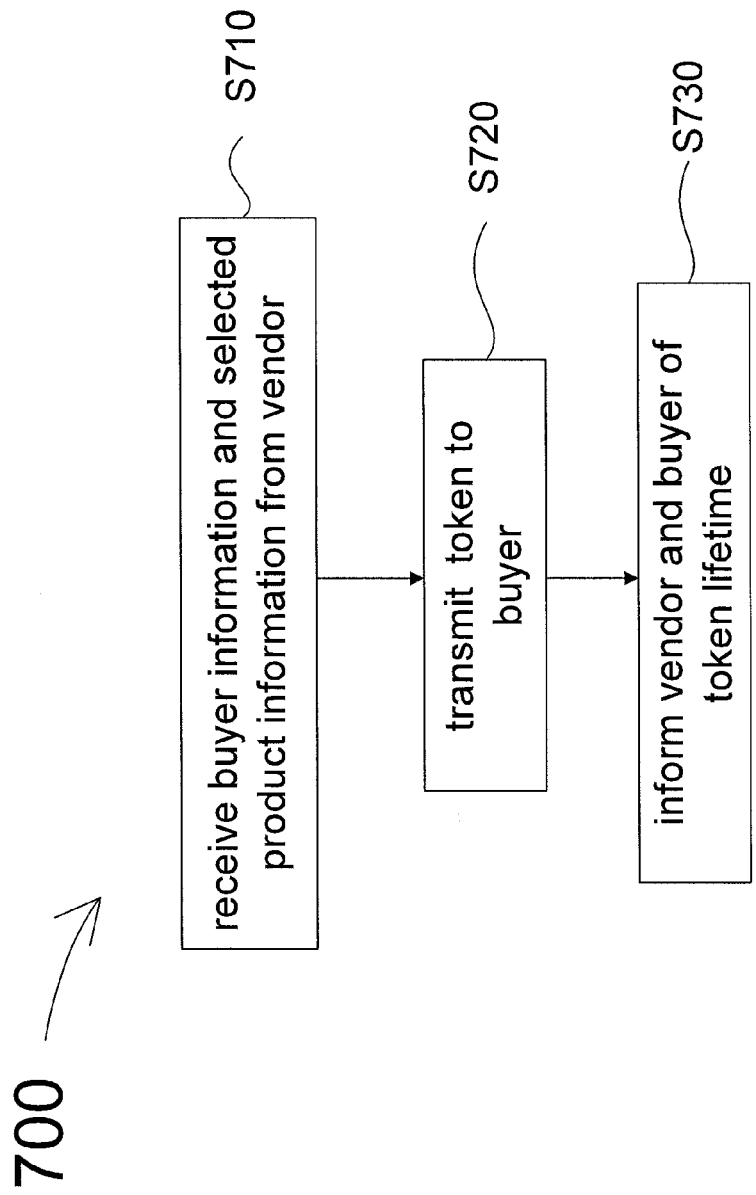
FIG. 7 shows a flow diagram in a method for performing payments in remote transactions, according to embodiments disclosed herein.

FIG. 7 shows a flow diagram in a method 700 for performing payments in remote transactions, according to embodiments disclosed herein. Method 700 may be performed by a service provider, such as with an IVR center included in a private account service provider. The service provider may be as service provider 115, and the IVR center may be such as IVR center 110 or IVR center 210 described in detail above (cf. FIGS. 1 and 2). For example, an IVR center performing method 700 may be IVR center 110 or IVR center 210, and a private account service provider may be private account service provider 115 (cf. FIGS. 1 and 2). In embodiments consistent with the present disclosure, method 700 is performed when a buyer has selected a product and a CL button on a vendor's network outlet. For example, the user may be navigating the internet using a computer or a mobile device having internet connection, such as computer 105 (cf. FIG. 1) at the time of deciding to make a purchase. The vendor's network outlet may be hosted by a server such as server 250 (cf. FIG. 2). Further according to some embodiments, method 700 may be partially performed by IVR center in conjunction with method 600 described above (cf. FIG. 6).

In S710 IVR center receives a buyer information and selected product information from a vendor. According to some embodiments, S710 may be as S610 in method 600, described in detail above in relation to FIG. 6. In S720 the IVR center transmits a token to the buyer. In some embodiments consistent with the present disclosure, S720 includes transmitting a user-friendly token to the buyer. A user-friendly token may include a user-friendly token code. The buyer may provide the user-friendly token code to the IVR center when prompted to do so, using substantially any type of mobile phone. Further details of S720 may be as S620 described above in relation to FIG. 6.

In S730 the IVR center informs the vendor and the buyer of the token lifetime. According to embodiments disclosed herein, the IVR center determines the expiration time of the token using the buyer information and the selected product information received in S710. Thus, in S730 the IVR center provides the token expiration time for the benefit of the buyer and the vendor. According to some embodiments, at the time of checking the CL button and the selected product, the buyer may also request a certain range for the expiration time of a token. This option may be provided at the vendor's network outlet as an added feature offered by the IVR center to potential buyers of the vendor's products. Further, the price associated to the selected product (and the token) may vary according to the expiration time requested by the buyer. Different market scenarios may induce varying strategies to adjust the token value to its expiration time. For example, in some embodiments it may be desirable to increase the price of the selected product when the user requests a longer expiration time for the token. Further according to some embodiments, the vendor may request the IVR center to select a certain range for the token expiration time.

Embodiments consistent with the present disclosure provide flexibility for online purchase transactions. Embodiments disclosed herein also provide alternative payment methods for a buyer through a private account service provider to which the buyer is subscribed. Methods and systems for payment consistent with the present disclosure may be performed anytime, anywhere. The simplicity of a user-friendly token provided by the IVR center to the buyer enables the buyer to use substantially any type of mobile phone currently available in the market.

One desirable feature of embodiments disclosed herein is that the buyer may use an ordinary mobile phone to make a purchase through a private account service provider. For a vendor, methods and systems of payment consistent with the present disclosure may secure a purchase even in the event of being temporarily out of stock of a selected product. In such circumstance, the buyer may use a CL button in a vendor's network outlet to start the purchase process. The purchase is completed once the vendor refills the stock. A user-friendly token pertaining to the selected product is transmitted to the buyer. Thus, the buyer may complete the purchase from anywhere, at a later time.

Embodiments consistent with the present disclosure may enable a buyer to complete an online purchase even in the event of an emergency. In some circumstances, the buyer may be in the process of reloading funds to an account in a private account service provider. In such circumstances, the buyer is able to complete the purchase of the selected product using a mobile phone later. The buyer may be moving in a car at any time before the token expires, while completing the purchase.

Embodiments of the present disclosure may perform as a virtual a cart where a buyer may place a plurality of selected products while shopping around, online. Payments for each of the selected product are secured as the IVR center does not share the buyer's financial information with each of the vendors providing the selected products for purchase.

While specific configurations and embodiments may differ slightly from the embodiments disclosed above, obvious modifications may not depart from the general concept disclosed herein. Embodiments consistent with the present disclosure increase the revenue for a private account service provider, as the volume of purchase transactions through an IVR center is increased. The volume of transactions is increased because methods and system for payment using online commerce as disclosed herein are convenient for both buyers and vendors. For the buyer, embodiments disclosed herein simplify the payment method by extending it in time. Further, payment methods and systems as disclosed herein provide a secure mechanism for the buyer, since no sensitive information is exchanged between the user and the IVR center. The IVR center manages the purchase transaction without sharing buyer's personal information with the vendor. For vendors, embodiments consistent with the present disclosure increase the probability of finalizing a purchase by offering the buyer a transaction stretched in time. Methods and systems consistent with the present disclosure also provide vendors more time to replenish or re-stock products that may be selected remotely for purchase.

Embodiments of the invention described above are exemplary only. One skilled in the art may recognize various alternative embodiments from those specifically disclosed. Those alternative embodiments are also intended to be within the scope of this disclosure. As such, the invention is limited only by the following claims.

What is claimed is:

1. A method for performing payments in remote transactions between a buyer and a vendor, the method comprising:
   receiving, electronically by a processor of a service provider, information of a buyer selection from a vendor's network outlet when the buyer indicates a desire to purchase the buyer selection at a later time through an Interactive Voice Response (IVR) center;
   providing a token to the buyer;
   receiving information about the token from the buyer through the IVR center;
   verifying the information about the token;
   transferring funds from a buyer account to a vendor account.

2. The method of claim 1 further comprising providing a button to the vendor's network outlet, the button linked to the IVR center.

3. The method of claim 1 further including notifying at least one of the buyer and the vendor of the transaction completion.

4. The method of claim 1 wherein receiving the information of a buyer selection comprises receiving information of a selected product and receiving a buyer's e-mail address.

5. The method of claim 1 wherein the token is a user-friendly token and has an expiration time.

6. The method of claim 5 wherein receiving the token information from the buyer occurs at a time no later than the expiration time of the token, after the button is selected.

7. The method of claim 1 further comprising confirming the availability of the selected product when the token information from the buyer is received.

8. The method of claim 7 further comprising receiving a personal identification number (PIN) from the buyer when the availability of the selected product is confirmed.

9. The method of claim 1 further comprising receiving from the vendor a request to host a button in the vendor's network outlet; and
   installing an internal application in a vendor data center to communicate the vendor with the IVR center.

10. A system for processing payments in remote transactions, the system comprising:
    an interactive voice response (IVR) center configured to communicate with a buyer;
    a server coupled to the IVR center, the server configured to manage a plurality of private accounts including a buyer account and a vendor account; and
    a database coupled to the server, the database comprising information about the buyer account and the vendor account; wherein
    the server comprises a processor operable to:
        receive a request for a token from a buyer to purchase a selected product from a vendor, and to receive information about the selected product;
        provide the token to the buyer via the IVR center;
        access the database; and
        transfer funds from the buyer account to the vendor account upon a buyer confirmation received by the IVR center.

11. The system of claim 10 wherein each of the IVR center and the server has a network connection.

12. The system of claim 10 wherein the token provided to the buyer is a user-friendly token and has an expiration time.

13. The system of claim 10 wherein the IVR center, the database, and the server are part of a private account service provider.

14. The system of claim 10 wherein the IVR center is configured to receive a call from the buyer to pay for the purchase.

15. The system of claim 14 wherein the IVR center requests the token from the buyer to authenticate the purchase.

16. The system of claim 10 wherein the IVR center is configured to inform the vendor that the selected product has been checked out for a later payment.

17. A computer program product comprising a non-transitory computer readable medium having computer readable and executable code for instructing a processor in a service provider to perform a method, the method comprising:
    receiving, electronically by the processor, information of a buyer selection from a vendor's network outlet when the buyer indicates a desire to purchase the buyer selection at a later time through an Interactive Voice Response (IVR) center;
    providing a token to the buyer;
    receiving information about the token from the buyer through the IVR center;
    verifying the information about the token;
    transferring funds from a buyer account to a vendor account.

18. The computer program product of claim 17 further wherein the method comprises providing a button to the vendor's network outlet, the button linked to the IVR center.

19. The computer program product of claim 17 further wherein the method comprises notifying at least one of the buyer and the vendor of the transaction completion.

20. The computer program product of claim 17 wherein receiving the information of a buyer selection includes receiving information of a selected product and receiving a buyer's e-mail address.

\* \* \* \* \*